Aug. 22, 1944.  K. W. SCHADE  2,356,620
PHOTOGRAPHIC JUSTIFYING APPARATUS
Filed March 19, 1941  2 Sheets-Sheet 1

Inventor
K. W. SCHADE

By *[signature]*
Attorney.

Inventor
K. W. SCHADE
By Allen Holcombe
Attorney.

Patented Aug. 22, 1944

2,356,620

UNITED STATES PATENT OFFICE 2,356,620

PHOTOGRAPHIC JUSTIFYING APPARATUS

Karl Werner Schade, Berlin, Germany; vested in the Alien Property Custodian

Application March 19, 1941, Serial No. 384,199
In Germany February 13, 1940

4 Claims. (Cl. 95—4.5)

This invention relates to a method and apparatus for producing typewritten matter to obtain a justified printing work.

It is an important object of the present invention to provide means for justifying the individual lines of the typewritten matter in a simple, inexpensive and reliable manner.

In the United States Letters Patent No. 1,992,017, means have been described for justifying typewritten matter by way of a stretchable character receiving medium which is subjected to a mechanical stretching operation.

It is an object of the present invention to provide means for justifying the typewritten matter without any mechanical stretching or contraction of the typewritten matter.

A special object of the invention is to provide means ensuring sharply defined contours of the justified lines.

Another object of the invention is to provide a more or less foolproof justifying method which does not require highly skilled operators.

With these and further objects in view, as may become apparent from the within disclosures, the invention consists not only in the structures herein pointed out and illustrated by the drawings, but includes further structures coming within the scope of what hereinafter may be claimed.

The character of the invention, however, may be best understood by reference to certain of its structural forms, as illustrated by the accompanying drawings in which.

Similar characters of reference denote similar parts in the different views.

Broadly stated, the invention contemplates the justification of the lines by optical means.

Figure 1:
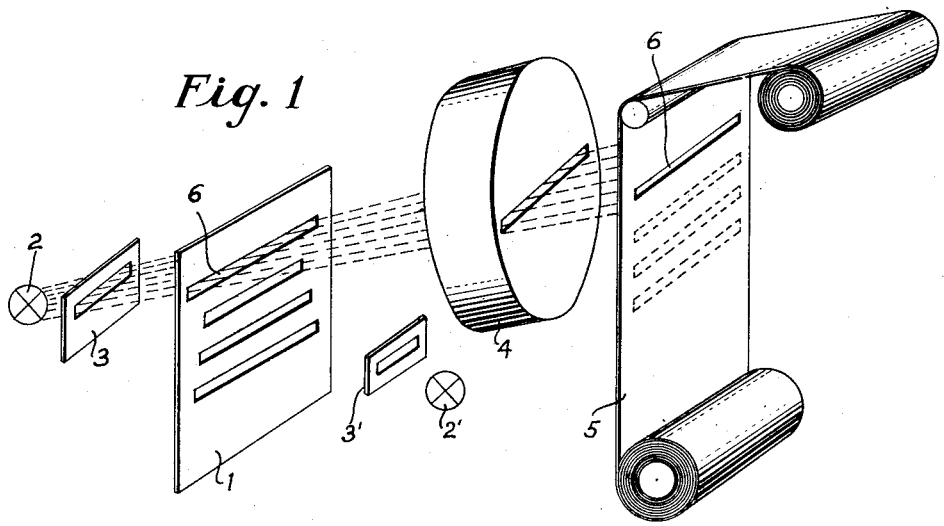
Fig. 1 is a diagrammatic, perspective view showing an arrangement for carrying out the method contemplated according to the invention.

In the practice of my invention, I may proceed in this manner that the typewritten matter on a sheet 1, Fig. 1, is illuminated line by line from a source of light 2, lying behind the support 1 which in this case consists of a transparent material, such as, transparent paper, with non-transparent letters thereon, or vice versa. A diaphragm or screen 3 serves to diaphragm the light from source 2 to form a rectangular pencil of rays which after passage through sheet 1 and modification through the typewritten matter thereon is projected, through an optical system 4, shown in greater detail in Fig. 4, upon a light sensitive strip 5, for reproducing thereon the line 6 of sheet 1 which is being transluminated.

It is now possible, by suitable adjustment of the scale of projection of the optical system 4, to vary the length of the line projected on the light-sensitive strip 5, for justifying the line. Normally, of course, the height of the letters in the line will be varied proportionally, and, moreover, the light sensitive sheet 5 will get out of focus by changing the degree of magnification, which would result in lack of sharpness of the letters which are being projected. The invention, however, contemplates the provision of means for removing this deficiency, as illustrated by way of example in Figs. 2 and 3.

Figure 2:
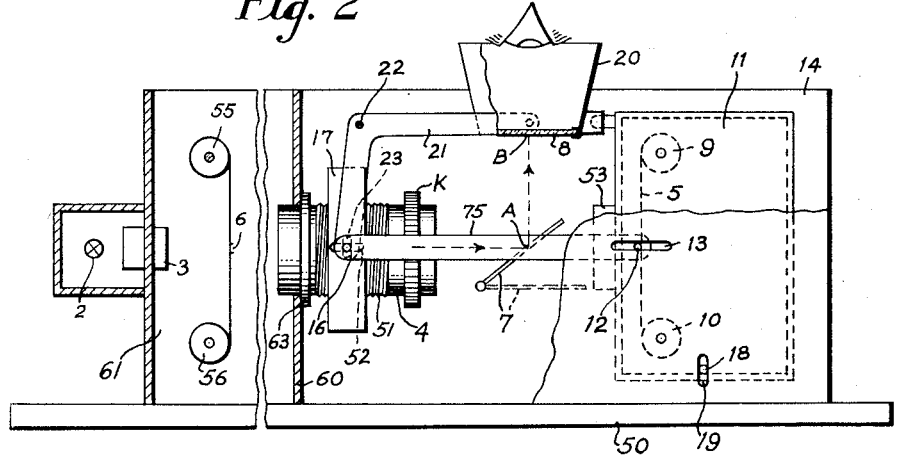
Fig. 2 shows an elevation, partly in section, of a practical device embodying the principle of Fig. 1.
Figure 3:
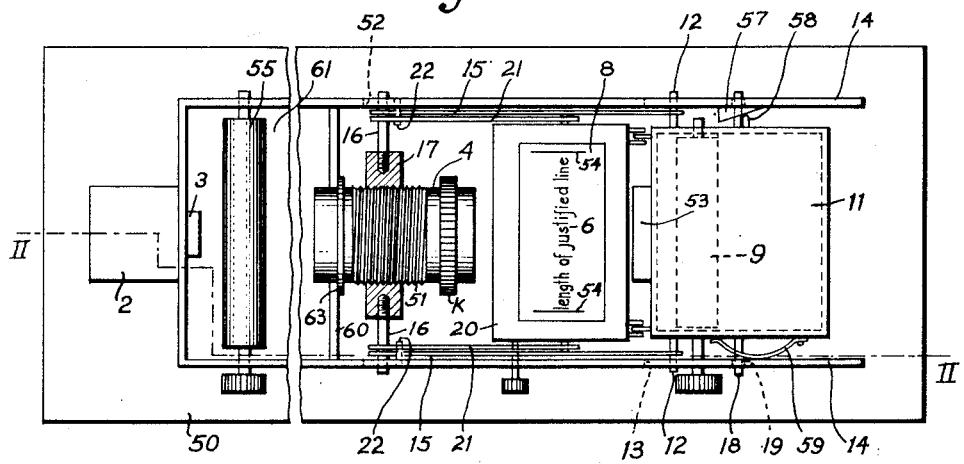
Fig. 3 is a plan view of Fig. 2.

Referring to these Figs. 2 and 3, showing purely schematically a practical embodiment for carrying out the invention, it will be noted that the arrangement is substantially the same as shown in Fig. 1, but with the inclusion of additional means which will be hereinafter described. The original typewritten matter 1 in this case is in the form of a strip stretched between rollers 55 and 56. A swingable mirror 7 is provided between the optical system 4 and the light sensitive sheet 5, for deflecting the image of the line towards a ground glass screen 8 before exposing strip 5.

Further, the rollers 9 and 10 carrying strip 5 are revolubly mounted in a casing 11 which is swingable on pivots 12. The pivots 12 in turn are slidably mounted in slots 13 of side walls 14 mounted on a base plate 50, and are connected, by connecting rods 15, with studs 16 of a ring 17 which is threadedly engaged with a rotary member 51 taking part in the adjusting movement of the optical system 4, but is held against rotation by the studs 16 extending through longitudinal slots 52 in the side walls 14. The casing 11 for rollers 9 and 10 moreover by means of a stud 18 engages a slot 19 in one of the side walls 14 for the purpose which will be set forth later.

The ground glass screen 8 is provided with a darkening funnel or shaft 20 to prevent the direct access of daylight and is mounted on a pair of angle levers 21 which are pivoted at 22 in the side walls 14 and are operatively connected, by slots 23, with the studs 16, 16 which extend through the horizontal slots 52 in the side walls 14. The ground glass screen 8 in its medial position has the same distance from point A, where the light rays are deflected, as strip 5. Point B on ground glass 8, where the deflected light ray impinges upon the glass 8, is disposed at a lever arm whose length is in a predetermined proportion with respect to the lever arm from pivot 22 to a stud 16, for the purpose which will be hereinafter described. A slit stop 53 is arranged in the front wall of casing 11, for passage of the pencil of light in the exposure operation.

The operation of this apparatus is as follows: The swingable mirror 8 at first is swung into its inclined position as shown in full lines, Fig. 2, and the source of light 2 is switched on. The pencil of rays after passage through diaphragm 3, typewritten sheet or strip 1 and optical system 4 is reflected, by mirror 7, on ground glass 8, whereby the line 6 of strip 1 is reproduced on the ground glass at first in its undistorted length. Now, the optical system 4 by means of its knurled ring K is readjusted until the line 6 on the ground glass screen 8 fits exactly between parallel lines 54 on the screen, marking the final length of the line.

Hereafter, mirror 7 is removed from the pencil of rays and the split stop 53 is opened for exposure of the strip 5, whereupon the rollers 55, 56 and the rollers 9 and 10 are moved on by one line space and the procedure is repeated.

Of course, where a normal optical system is used for magnifying or reducing the line, in accordance with its deviation from the standard length, the screen 8 and the light sensitive strip 5 if stationary with respect to the optical system would get out of focus. Manual means may be provided for readjusting screen 8 and strip 5 to compensate this and restore sharpness of projection, but I contemplate the provision of means rendering manual readjustment unnecessary. The compensation may be effected by a suitable design of the optical system 4 which will be described with reference to Fig. 4, or by a mechanical compensating system, as exemplified in Figs. 2 and 3. Referring first to the latter figures, it will be noted that casing 11 with strip 5 by means of parts 51, 17, 16, 15, 12, is caused to follow the axial adjusting movements of the optical system 4. The arrangement may be such as to require commensurate axial shifting of the movable part of the optical system 4 and strip 5 to keep strip 5 in focus; or the pitch of the thread on member 51 may be selected to secure any other proportional or non-proportional ratio between the movements of the optical lenses and strip 5 in conformity with the optical conditions.

In the same way, of course, the screen 8 has to be readjusted, this being automatically effected in this instance by means of the angle lever 21 which of course may be made with lever arms of suitable relative length to follow the same law of shifting as strip 5. Of course, there is a certain degree of mis-adjustment of screen 8 owing to the non-linear movement thereof, but this in most instances will be tolerable since the maximum adjustment remains within narrow limits.

It will be recognized that where normal magnifying or projecting systems are used, the lines are distorted not only in their length but also as to their vertical height. In other words, if the line is to be stretched by 10 percent for justification, the height of the letters also will be increased by 10 percent. In many instances, this may be tolerable, since a 10 percent justification of a line of 80 mms. lengths, for example, gives 8 mms. or 3 to 4 letters, as against a variation in height of not more than 0.3 mms. in case of letters of 3 mms. height. However, the invention contemplates also the elimination of this possible deficiency by optical or, by way of alternative, by mechanical means. Again, referring first to the latter method, the compensation of the height may be effected by tilting the letters by a certain angle in such a manner that their projection on sheet 5 becomes lower than their actual height. This again may be effected by manual adjustment, but in the arrangement of Figs. 2 and 3, the compensation is effected automatically by action of slot 19 holding stud 18 of casing 11 in its position and thereby tilting the casing automatically as the same is shifted axially through action of members 51, 17, 16, 15, 12. The amount of swinging is determined by the vertical distance of stud 18 from pivots 12, i. e., the correct amount of compensation may be found out by providing an adjustable stud 18 and readjusting the same in a slot of casing 11. The slight amount by which the top and bottom portions of the letters get out of focus by such tilting may be neglected in most practical instances.

It will be noted from Fig. 1, that the typewritten text is arranged in such a manner that the lines of different length are symmetrical, receding and projecting by the same amount on both sides. This is required to secure symmetrical reproduction on sheet 5 as shown. With normal typewritten text, however, the first letters of the successive lines are aligned, while the differences are at the ends of the lines. In order to render possible the use of typewritten matter of this normal kind, the casing 11 with strip 5 may be mounted to permit lateral sliding of studs 12 in slots 13 in such a manner that the lines, although disposed unilateral rather than symmetrical on the original 1, are projected on strip 5 in exact alignment of their beginnings and ends. This again may be carried out automatically by means of inclined guiding faces 57 provided on the inner sides of one side wall 14 and held in engagement with projections 58 of casing 11 through a leaf spring 59 on the opposite side, in such a manner that casing 11 is shifted laterally in accordance with the amount of justification, i. e., by half the amount of justification. In other words, where a line has to be justified by 8 mms., casing 11 will be shifted laterally by 4 mms. in a direction to project the line exactly symmetrically with respect to the center line of the reproduced typewritten matter.

Figure 4:
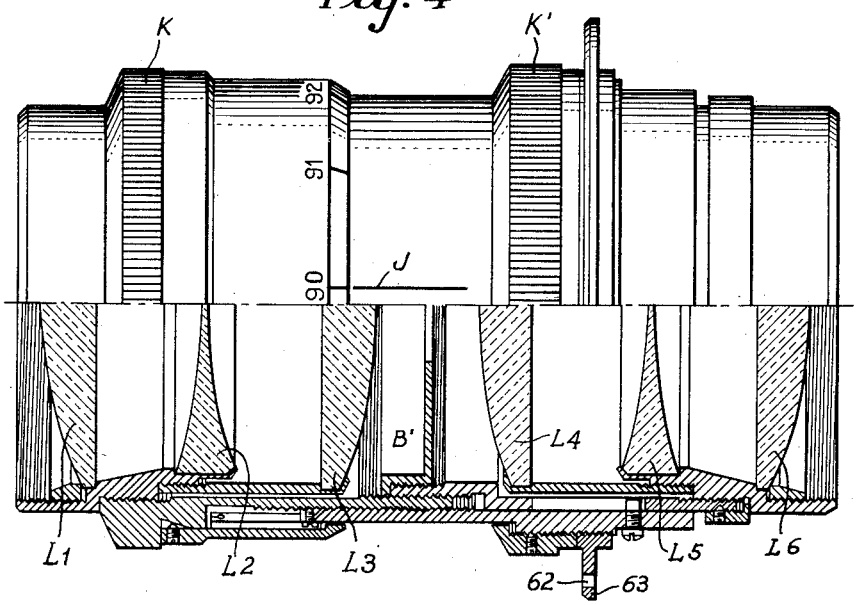
Fig. 4 is an optical system for use in the arrangement of Figs. 1 to 3.

It will thus be understood that the arrangement shown in Figs. 1 and 2 and 3 renders it possible to reproduce and to justify line by line of the typewritten matter from sheet 1 on strip 5 by optical means, while keeping the height of the lines substantially altered. The invention also contemplates, however, the provision of an optical system which is so constructed that the ratio of magnification and reduction can be changed without requiring readjustment of strip 5 in order to keep it in focus and to preserve full sharpness of projection. Optical systems adapted to accomplish this result are known in the art as "anamorphotic" and "pancratic" lens system. Either system may be used, but in the practice of my invention, the "pancratic" lens system proved to be especially suitable owing to its simple operation. A suitable pancratic lens system has been illustrated by way of example in Fig. 4, showing the parts partly in elevation and partly in section. It will be noted from this figure that the optical system consists of two symmetrically arranged anastigmatic lens groups or objective systems comprising three lenses each, numbered $L_1$—$L_3$, or $L_4$—$L_6$, respectively. In case of a reproduction of the lines in their original size there is a telecentric or parallel trace of the rays between the lenses $L_3$ and $L_4$, and the trace of the rays is symmetrical throughout the optical system. By operation of the knurled ring K the two objective systems can be shifted in the direction of the optical axis, in such a manner that the reproduced image of the line on strip 5, Fig. 1, remains sharp in focus although the distance between lens system 4 as a whole and strip 5 remains unchanged. The length of the line, on the other hand, is varied by relative shifting of the objective systems, thus permitting justification of the line.

The lens shifting in this case is effected in such a manner that the lens groups are moved away from the original typewritten matter 1. To this end, a special system of male and female threads of different pitches are provided on the tubular lens holders, as shown, whereby the lens holders are telescoped in such a manner that the objective system $L_1$—$L_3$ facing the original typewritten matter 1 is moved away from said sheet 1 at a higher rate of speed than objective system $L_4$—$L_6$ facing the light-sensitive sheet or strip 5. Said shifting of the lens groups through knurled ring K permits, for instance, a variation of the scale of reproduction from 1:1 to 1:0.9. Thus, for example, typewritten lines of 90 to 100 mms. length may be reproduced with a constant length of 90 mms. The length of the line on the original 1 which has been adjusted can be read from an index mark J in connection with a graduation on the rotary ring K bearing the numerals 90, 91, 92, 93, 94, 95, 96, 97, 98, 99, 100, indicating the length of the original line on sheet 1 in millimeters.

Provided between the two objective systems is a stationary diaphragm B intended to ensure reproduction free from shadows. The second knurled ring K' serves for fixing the optical system, for example, on the wall 60 of casing 61, Figs. 2 and 3, as by means of screws passed through bolt holes 62 in flange 63. The optical system of Fig. 4 thus may be inserted at 4 in the arrangement of Figs. 2 and 3, and owing to its special feature of constant sharpness of reproduction, the members 51, 17, 16, 15, 12 effecting axial shifting of strip 5 as well as the members 21, 22 effecting vertical swinging of screen 8 may be dispensed with in this case. Of course, this at the same time would render ineffective the members 18, 19 serving for tilting strip 5, but in fact it has been found that, where a pancratic lens system is used, the height of the letters remains practically unchanged so that the reproduction is satisfactory even without such compensation in height by tilting. Practical measurements have shown that the distortion in height is not proportional to that in the longitudinal direction of the line which in the above mentioned example would be 10 percent in maximum, but is actually smaller and practically negligible. It will be appreciated that this is an important additional advantage of the pancratic lens system and, to a certain extent, of the anamorphotic lens system, affording a considerable simplification of the mechanical implements. The only remaining mechanical adjustment in this case will be regarding the lateral shifting of the strip 5 to ensure symmetrical reproduction of normal typewritten matter having the initial letters of the lines altogether aligned with each other, but this may be avoided by the use of typewritten matter having the lines arranged symmetrically, as per Fig. 1. Where this appears impracticable, a simple mechanism for providing symmetry may be created, for example, by laterally shifting the rollers 55, 56, carrying strip 1, through a rod and lever system (not shown) operated from a cam disc (not shown) which partakes in the adjusting motion of ring K of the optical system.

Where it is intended to use a non-transparent sheet 1, a source of light 2' may be provided for lighting the typewritten matter by means of incident light, through a diaphragm 3', as shown in Fig. 1 in dotted lines. In this case a material of high light reflecting power should be used for strip 1. The trace of the rays for the rest is the same as hereinbefore described.

On exposure of the successive lines on strip 5 the same is developed and fixed in known manner and the justified typewritten matter secured by the use of this invention can be used for reproduction by photography, photoengraving, photolithography or other photo-mechanical process. The invention also contemplates using a strip 5 which is directly suitable as a photo-lithographic sheet for an offset printing process, thus directly giving a satisfactory printed work starting from an ordinary typewritten matter on a typewriter sheet, without any mechanical stretching or contracting operations.

While my invention primarily aims at the justification of typewritten matter, it is also contemplated that the size of the letters may be varied at the same time, if desired. This may be achieved by the provision of a suitable optical system and arrangement permitting a reproduction at a ratio substantially different from 1:1.

I claim:

1. In photographic justifying apparatus comprising a light source, adjustable lens means aligned with said light source and movable towards and away from said source, means for holding material to be photographed located between the light source and the lens means, and a casing for holding a sensitized film aligned with said lens means on the side of the latter away from said light source, said casing being provided with an opening facing said lens means, the combination of means for supporting said casing for simultaneous axial movement along the optical axis of said lens means and for tipping movement about a horizontal axis which is substantially perpendicular to said optical axis, lever means connected to said casing and said lens means and movable on adjustment of the lens means for causing movement of said casing, a second lever means pivotally supported between its two ends and having one of its ends connected to said first lever means at the end of the latter adjacent said lens means whereby the second lever means is moved in accordance with the movement of the first lever means, and a viewing screen connected to the second end of said second lever means and movable therewith for viewing the image formed by said lens means, the rays transmitted through said lens means being adapted to be directed onto said viewing screen by deflecting means removably interposed in their normal path to direct them onto the viewing screen, said viewing screen being located above the optical axis of the lens means and at a distance therefrom wherein the lens means will form its image substantially in the plane of the viewing screen when the latter is being used.

2. In photographic justifying apparatus, the combination comprising means for holding material to be photographed, a light source positioned to illuminate material held by said holding means, lens means comprising lens elements located to receive light proceeding from material carried by said holding means, said lens elements being adjustably movable along the optical axis, spaced apart support members located on opposite sides of the optical axis of said lens means, casing means for holding light sensitive photographic material aligned with said lens means located between the support members on the image side of the lens means, said casing means being provided with an opening facing the lens means, separate guide means positioned in each support member in perpendicular relationship to each other, support means engaged with each guide means and with said casing means whereby the casing means is slidable along the optical axis of the lens means and is tipable about a substantially horizontal axis which is substantially perpendicular to said optical axis, lever means connected to said casing and said lens means and movable on adjustment of the lens means for causing movement of said casing, a second lever means pivotally supported between its two ends and having one of its ends connected to said first lever means at the end of the latter adjacent said lens means whereby the second lever means is moved in accordance with the movement of the first lever means, and a viewing screen connected to the second end of said second lever means and movable therewith for viewing the image formed by said lens means, the rays transmitted through said lens means being adapted to be directed onto said viewing screen by deflecting means removably interposed in their normal path to direct them onto the viewing screen, said viewing screen being located above the optical axis of the lens means and at a distance therefrom wherein the lens means will form its image substantially in the plane of the viewing screen when the latter is being used.

3. In photographic justifying apparatus, the combination comprising means for holding material to be photographed, a light source positioned to illuminate material held by said holding means, lens means located to receive light proceeding from illuminated material, said lens means comprising lens elements adjustably movable along the optical axis, holding means for light sensitive photographic material located on the image side of the lens means and aligned with the lens means, means for supporting the photographic material holding means for simultaneous movement along said optical axis and for tipping movement about a horizontal axis which is substantially perpendicular to said optical axis, a pair of connecting members each engaged to a side of the photographic material holding means and connected to said lens means, said connecting members being movable in accordance with the movement of the lens means, a second pair of connecting members, each second named connecting member being pivoted between its ends and connected at one end to said lens means whereby each second named connecting member is moved in accordance with the movement of the lens means, a movable viewing screen connected to the second end of each second named connecting member, said viewing screen being moved on movement of the second named connecting members, and deflecting means removably interposed in the path of light transmitted through said lens means for directing said light onto the viewing screen, said viewing screen being located above said optical axis and at a distance therefrom wherein the lens means will form its image substantially in the plane of the viewing screen when the latter is employed.

4. In photographic justifying apparatus as claimed in claim 3, a rotatably mounted housing in which the lens elements of said line means are mounted and which is rotated on the movable adjustment of the lens elements, a traveling ring member threaded on the exterior surface of said housing, and means for preventing the rotation of said ring while permitting movement of said ring axially of the housing, said connecting members having their ends adjacent to said lens means connected to said ring.

KARL WERNER SCHADE.